US009396537B2

(12) United States Patent　　(10) Patent No.: US 9,396,537 B2
Hirvonen　　(45) Date of Patent: Jul. 19, 2016

(54) SYSTEMS AND METHODS FOR LIVENESS ANALYSIS

(71) Applicant: EyeVerify, Inc., Kansas City, KS (US)

(72) Inventor: David Hirvonen, Brooklyn, NY (US)

(73) Assignee: EyeVerify, Inc., Kansas City, KS (US)

( * ) Notice: Subject to any disclaimer, the term of this patent is extended or adjusted under 35 U.S.C. 154(b) by 0 days.

(21) Appl. No.: 14/480,802

(22) Filed: Sep. 9, 2014

(65) Prior Publication Data

US 2016/0071275 A1　　Mar. 10, 2016

(51) Int. Cl.
*G06K 9/78*　　(2006.01)
*G06T 7/00*　　(2006.01)
*G06K 9/56*　　(2006.01)
*G06T 7/40*　　(2006.01)

(52) U.S. Cl.
CPC ............... *G06T 7/0026* (2013.01); *G06K 9/56* (2013.01); *G06T 7/004* (2013.01); *G06T 7/408* (2013.01); *G06T 2207/20024* (2013.01); *G06T 2207/30196* (2013.01)

(58) Field of Classification Search
None
See application file for complete search history.

(56) References Cited

U.S. PATENT DOCUMENTS

| | | | | |
|---|---|---|---|---|
| 6,075,905 | A * | 6/2000 | Herman et al. | 382/284 |
| 6,760,467 | B1 | 7/2004 | Min et al. | |
| 2011/0007949 | A1 * | 1/2011 | Hanna et al. | 382/107 |
| 2012/0300990 | A1 | 11/2012 | Hanna et al. | |
| 2013/0177206 | A1 * | 7/2013 | Hata | 382/103 |
| 2013/0342702 | A1 * | 12/2013 | Zhang et al. | 348/164 |
| 2014/0016837 | A1 * | 1/2014 | Nechyba | G06K 9/00228 382/118 |
| 2014/0147002 | A1 * | 5/2014 | Park et al. | 382/103 |

OTHER PUBLICATIONS

Porciatti, Vittorio, and Ferdinando Sartucci. "Normative data for onset VEPs to red-green and blue-yellow chromatic contrast." Clinical Neurophysiology 110, No. 4 (1999): 772-781.*
Amir-Khalili, A., et al. (Jan. 1, 2014) "Auto Localization and Segmentation of Occluded Vessels in Robot-Assisted Partial Nephrectomy," In Medical Image Computing and Computer-Assisted Intervention-MICCAI 2014, pp. 407-414.
Balakrishnan, G., et al., (Jun. 23, 2013) "Detecting Pulse from Head Motions in Video," 2013 IEEE Conference on Computer Vision and Pattern Recognition (CVPR), pp. 3430-3437.
Chen, J. G., et al., (Jan. 1, 2014) "Structural Modal Identification through High Speed Camera Video: Motion Magnification," Proceedings of the 32nd International Modal Analysis Conference, pp. 191-197.
Davis, A., et al. (Jul. 1, 2014) "The Visual Microphone: Passive Recovery of Sound from Video" ACM Transactions on Graphics, vol. 33, No. 4 (Proc. SIGGRAPH), p. 79.

(Continued)

*Primary Examiner* — Vikkram Bali
*Assistant Examiner* — Tracy Mangialaschi
(74) *Attorney, Agent, or Firm* — Goodwin Procter LLP (57) ABSTRACT

In a system for determining liveness of an image presented for authentication, a reference signal is rendered on a display, and a reflection of the rendered signal from a target is analyzed to determine liveness thereof. The analysis includes spatially and/or temporally band pass filtering the reflected signal, and determining RGB values for each frame in the reflected signal and/or each pixel in one or more frames of the reflected signal. Frame level and/or pixel-by-pixel correlations between the determined RGB values and the rendered signal are computed, and a determination of whether an image presented is live or fake is made using either or both correlations.

30 Claims, 8 Drawing Sheets
(6 of 8 Drawing Sheet(s) Filed in Color)

(56) References Cited

OTHER PUBLICATIONS

Liu, C., et al., (Jul. 1, 2005) "Motion Magnification," ACM Transactions on Graphics, vol. 24, No. 3 (Proc. SIGGRAPH), pp. 519-526.

Ryan, D. A., (Oct. 2014) "Visible Imaging of Global Mhd on Mast," Plasma Science, IEEE Transactions on, vol. 42, No. 10, pp. 2556-2557.

Wadhwa, N., et al., (Jul. 21, 2013) "Phase-based Video Motion Processing," ACM Transactions on Graphics, vol. 32, No. 4 (Proc. SIGGRAPH), p. 80.

Wadhwa, N., et al., (May 2, 2014) "Riesz Pyramids for Fast Phase-Based Video Magnification," 2014 IEEE International Conference on Computational Photography (ICCP), pp. 1-10.

Wu, H. Y., et al., (Jul. 1, 2012) "Eulerian Video Magnification for Revealing Subtle Changes in the World," ACM Transactions on Graphics, vol. 31, No. 4 (Proc. SIGGRAPH), p. 65.

Xue, T., et al., (Jan. 1, 2014) "Refraction Wiggles for Measuring Fluid Depth and Velocity from Video," Proc. of European Conference on Computer Vision (ECCV), pp. 767-782.

* cited by examiner

SYSTEMS AND METHODS FOR LIVENESS ANALYSIS

TECHNICAL FIELD

The present disclosure generally relates to image analysis and, in particular, to image processing techniques for detecting whether a subject depicted in an image is alive.

BACKGROUND

It is often desirable to restrict access to property or resources to particular individuals. Biometric systems can be used to authenticate the identity of an individual to either grant or deny access to a resource. For example, iris scanners can be used by a biometric security system to identify an individual based on unique structures in the individual's iris. Such a system can erroneously authorize an imposter, however, if the imposter presents for scanning a pre-recorded image or video of the face of an authorized person. Such a fake image or video can be displayed on a monitor such as a cathode ray tube (CRT) or liquid crystal display (LCD) screen, in glossy photographs, etc., held in front of a camera used for scanning. Some so-called spoof-detection systems can detect a fake image by ascertaining eye movement. But such a system may not be effective in identifying a fake video that includes the expected movement of the eye. Improved systems and methods are therefore needed for efficiently determining fake images and videos from those provided live by the authorized persons.

SUMMARY

In various implementations described herein, differences in reflective properties of real/authentic faces and impostor faces are used to distinguish live, authentic faces and/or eyes from imposter images/videos. This is achieved, in part, by rendering a reference signal on a screen held in front of a target, which can be a real face or a fake image, by recording a reflection of the reference signal by the target, and by computing one or more correlations between the reflected and the rendered signals.

Accordingly, in one aspect a computer-implemented method for determining whether a live image is presented for authentication includes rendering on a display device a time-varying first signal that include several different respective signals that are separated in phase from each other. The method also includes capturing, during the rendering, a number of images of a target that is illuminated by the rendered first signal, and applying a band pass filter temporally to the images to generate a plurality of filtered images. The method further includes extracting a second signal from the filtered images, and generating a first measure based on, at least, a temporal correlation of the first signal and the second signal. In addition, the method includes, for each pixel location in several pixel locations, extracting a respective signal for the pixel location based on changes to a respective value of the pixel location over time in a number of the filtered images, and calculating a respective pixel location correlation score for each of the pixel locations based on a correlation of the respective extracted signal of the pixel location to the first signal. The method further includes generating a second measure based on, at least, several of the pixel location correlation scores, and accepting or rejecting the target based on, at least, the first and second measures.

Each respective signal of the first signal can have a different color, and each of the colors can be rendered using a same frequency. In some implementations, each respective signal of the first signal is a different monochromatic signal, and the first signal can be sinusoidal. Each respective signal of the first signal can be a distinct sinusoid, and the sinusoids can be superimposed in the first signal. The respective signals of the first signal can be randomly generated. In some implementations, a particular respective value of a pixel location can be a color.

Each image can include a number of respective images that have each undergone a respective transformation, is at a different respective resolution, or includes a different respective spatial frequency band that corresponds to a selected illumination phenomenon. The first measure can be based further on whether a phase of the first signal matches a phase of the second signal. Extracting a second signal from the filtered images can include extracting the second signal from a respective dominant color value of each of the filtered images. In some implementations, the method further includes stabilizing the target in the several of the captured and/or processed images before applying the band pass filter. The band pass filter can be applied in the frequency domain or in the time domain.

In some implementations, generating the second measure based on, at least, a number of the pixel location correlation scores includes combining the pixel location correlation scores to generate the second measure. The target can be a human face and the combined pixel location correlation scores can be for pixel locations of a particular region of the face. The particular region of the face can be determined using one or more of: (i) dynamic image analysis to avoid, at least in part, one or more portions of the face that are occluded or over exposed in the plurality of images, and (ii) a mask or a weight map representing knowledge about features of the face that are likely to reflect the rendered first signal.

Each pixel location can represent several image data elements some or all of which can be at different resolutions. Each pixel location can be a weighted combination of the pixel location's respective image data elements. The several captured images can represent a Gaussian pyramid or a Laplacian pyramid. A particular filtered image of the filtered images can represent a weighted combination of a number of pyramid levels. Other embodiments of this aspect include corresponding systems, apparatus, and computer programs.

Particular implementations of the subject matter described in this specification can realize one or more of the following advantages. For example, the detection technique depends on an multi-spectrum pattern signal that is rendered while performing the detection. The images of the face and/or eye of a person from any pre-recorded video/image provided for authentication are unlikely to correlate to the multi-spectrum pattern signal provided during liveness detection. Moreover, any reflection of the multi-spectrum pattern signal from a screen rendering such video/image is likely to be different in nature than the reflection from the face and/or eye of a live person. Various implementations described herein can detect these anomalies, as explained below and, as such, can be more robust in distinguishing a live, authorized person from fake videos and/or images.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

The patent or application file contains at least one drawing executed in color. Copies of this patent or patent application

FIGS. 4A-4C row (d) depicts a temporal Butterworth filter used to generate the band-pass filter response depicted in FIG. 3(b).

FIG. 11 row(d) depicts a temporal Butterworth filter used to generate the band-pass filter response depicted in FIG. 10(b).

Like reference numbers and designations in the various drawings indicate like elements.

DETAILED DESCRIPTION

Figure 1:
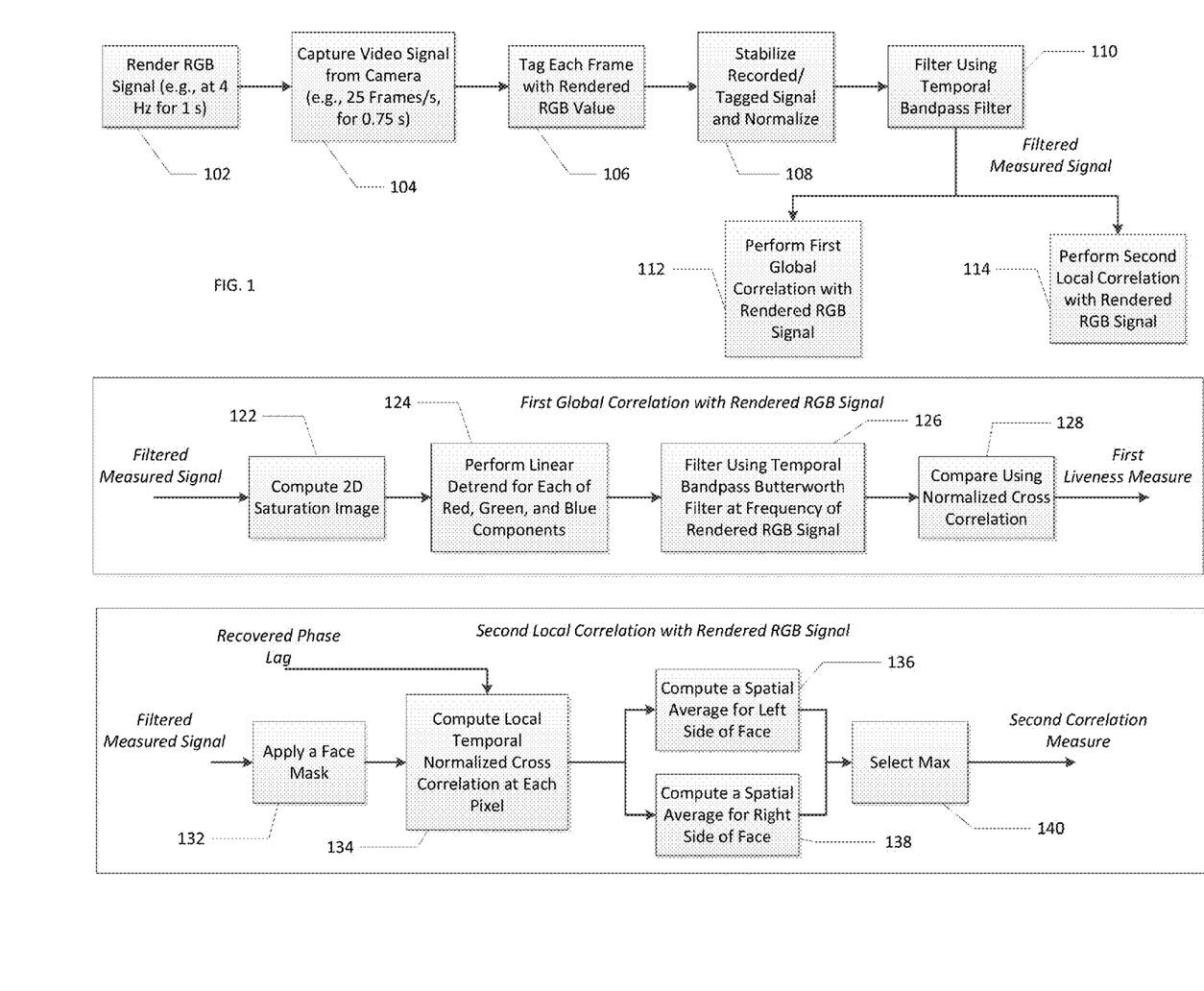
FIG. 1 illustrates an example procedure for determining two liveness measures.

FIG. 1 illustrates a general framework for computing two measures that can be used to distinguish between images of an eye obtained from an actual, live person and a fake (e.g., previously captured pictures or video of a live person). In step 102, a multi-spectral pattern is rendered on the display device such that the face (or "target") of a person is illuminated by the pattern. In some implementations, the pattern is displayed for about a second but other durations are possible. The display device can be the display device of a data processing apparatus such as, for example, a smart phone, smart glasses, a smart watch, a tablet computer, a laptop computer, etc. Other display devices are possible. Images of the target illuminated by the multi-spectral pattern are captured by a digital camera in step 104. In some implementations, the digital camera is a front facing digital camera of the data processing apparatus. Other digital cameras can be used, including digital cameras on other devices.

In various implementations the multi-spectral pattern includes three superimposed sinusoidal signals. For example, red, green, and blue (RGB) sinusoids can used to match the sensitivities of the native filters for each color channel on common Bayer pattern digital cameras. The sinusoidal signals can be rendered at substantially a single frequency so that a single band-pass filter can be used for subsequent analysis (described below). In addition, the three sinusoidal signals can be separated evenly in phase across the three color channels (e.g., red=0, green=(2*pi)/3, and blue=(2*pi)*2/3), to improve separability of the recovered signal and to reduce illumination gaps that can exacerbate flashing effects which can be uncomfortable to some users. In one implementation, a frequency of about 4 Hz, which is below the threshold for photo-sensitive epilepsy, yet is fast enough to be easily separable from typical low frequency illumination noise within a short period of time, is used. Other multi-spectral patterns can be used in addition to the RGB sinusoids, including patterns having fewer or more component signals, a red and blue sinusoid, for example.

A video signal that includes images captured by the digital camera is recorded in step 104. In some implementations, the video signal is a 0.75 second video clip at roughly 25 Hz., i.e., 25 frames/second. Other durations and frame rates are possible. In step 106, each frame in the recorded video signal can be tagged with the value (e.g., the RGB value) of the pattern being rendered on the display device in step 102 approximately at the time the image frame was captured. Exchangeable Image File (EXIF) metadata (or other metadata) can also be stored in step 106 generally to provide a measure of ambient illumination for automatic threshold adjustment. The metadata can include ambient brightness, exposure time, ISO setting, and/or the aperture value.

In some implementations, video stabilization (registration and warping) can be performed on the recorded video signal in step 108 in order to map points in the scene to a common reference coordinate system. After stabilization and warping, the frames can be converted to a normalized RGB color space to reduce sensitivity to shadows and other illumination artifacts in the environment and, thus, a stabilized and normalized video signal is obtained in the step 108.

In step 110, the stabilized and normalized video is processed using a temporal band-pass filter that is tuned to the frequency of the rendered sinusoid, e.g., 4 Hz in one example. By way of illustration, the filter can be applied to Gaussian pyramids corresponding to the stabilized and normalized video frames. The temporal band-pass filtering can be performed in order to isolate from the normalized signal obtained in the step 108, a response signal corresponding to the multi-spectral pattern rendered in the step 102. Finally, the band-pass filtered video signal is compared with the previously rendered multi-spectral pattern, e.g., at different scales, to obtain: (1) a global frame based, temporal correlation in step 112, and/or (2) a local pixel-wise correlation in step 114, as described below.

In order to compute a global temporal correlation measure, each frame of the filtered response signal obtained in step 110 can be represented with a dominant RGB value, in step 122. The dominant RGB value assigned in the step 122 is expected to correspond to the rendered RGB multi-spectral pattern color, as represented by the RGB values tagged to the recorded video signal in step 106. By way of illustration, the dominant RGB values can be computed via a robust mode from a chromaticity histogram or as a weighted average of pixel values for each frame. Other ways of determining the dominant RGB value are possible.

An average saturation image is computed from the filtered response signal (step 110) and can be used to provide the weights for the weighted average method (step 122). In some implementations, the average saturation image is the distance from a gray image corresponding to the frame to be processed. The resulting two-dimensional (2D) saturation image is proportional to the reflected RGB multi-spectral pattern strength. Next, in step 124, a linear detrend is performed independently in each of the estimated red, green, and blue signals, in order to remove any ramp component from the data, making it more suitable for comparison with the reference RGB multi-spectral pattern signal. The linear detrend can be calculated using a linear m-estimator, for example.

Figure 2:
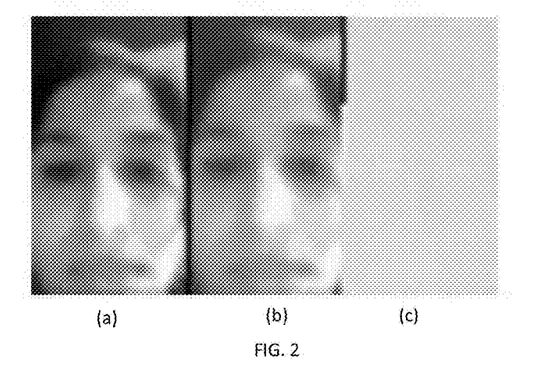
FIGS. 2(a)-2(c) depict an example captured video frame, a corresponding normalized and stabilized video frame, and a corresponding temporal band-pass filtered frame, respectively.
Figure 3:
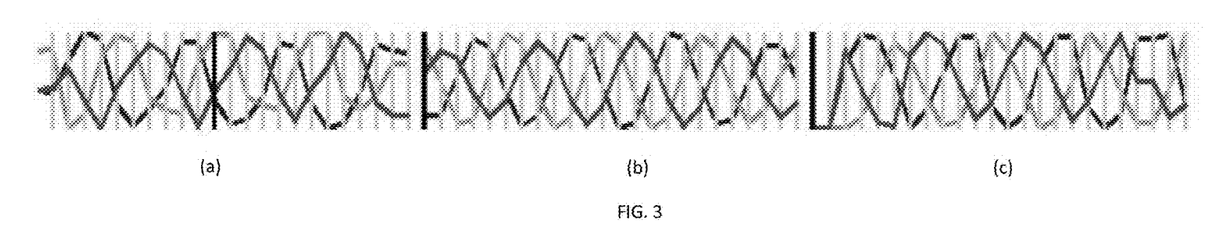
FIGS. 3(a)-3(c) depict example recovered RGB signals corresponding to a sequence of captured video frames, band-pass filter response of the recovered RGB signals, and the corresponding rendered reference RGB signals, respectively.
Figures 4A, 4B, 4C, 4D:
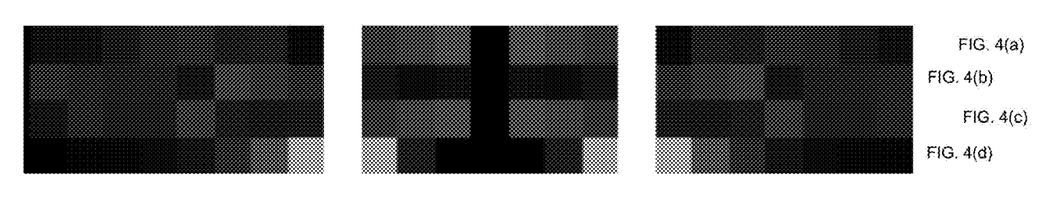
FIGS. 4A-4C rows (a)-(c) depict, top to bottom, fast Fourier transform (FFT) periodograms of the RGB signals depicted in FIGS. 3(a)-3(c), respectively.

FIG. 3(*a*) shows an example global RGB signal. The signal is called "global" because it represents the dominant RGB values corresponding to one frame and not to any one particular pixel in that frame. In step 126, this global signal is processed with a temporal band-pass Butterworth filter in the frequency domain to extract the appropriate frequency corresponding to the recorded signal. FIGS. 2(*b*) and 2(*c*) show the filtered RGB signal and the rendered reference signal (i.e., the RGB multi-spectral pattern), respectively. These two signals are compared in step 128 using a normalized cross correlation, and the resulting value, denoted nxcorr, indicates a first liveness measure. In one implementation, a small one dimensional (1D) temporal search is performed in step 128 to compensate for latency in the camera driver, that can cause a small shift between the measured and the rendered RGB signals. The search is a 1D search because each point in the combined waveform in FIG. 2(*a*) represents a whole frame. FIGS. 4A-4C rows (a)-(c) depict fast Fourier transform (FFT) periodograms of the signals depicted in FIGS. 3(*a*)-3(*c*), respectively.

Local Pixel-Wise Correlation

Figure 5:
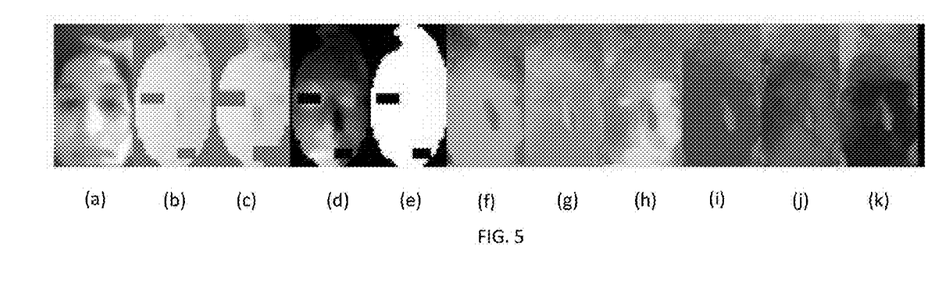
FIG. 5(a) depicts an example averaged normalized and stabilized image frame.
FIGS. 5(b)-5(d) depict a corresponding two dimensional (2D) correlation image, a processed correlation image, and a corresponding saturation image, respectively.
FIG. 5(e) depicts an example face mask.
FIGS. 5(f)-5(k) depict example captured video frames, corresponding to a full cycle of a reference RGB signal, using which the 2D correlation image shown in FIG. 5(b) is computed.

In step 114, a spatial average of local temporal normalized cross correlation computed at each pixel location in the filtered video response (i.e., the signal obtained in step 110 by filtering the stabilized and normalized recorded signal via the temporal bandpass filter), is computed. The spatial averaging can produce a 2D correlation image (e.g., in a range [−1 . . . +1]) that can indicate how accurately each pixel in the filtered response matches the rendered RGB signal. For example, FIG. 5(*b*) shows a correlation image corresponding to an example stabilized and normalized recorded image depicted in FIG. 5(*a*). FIG. 5(*c*) shows a processed 2D correlation image obtained, for example, by selecting the maximum of left and right correlation images, as described below. In order to compute a 2D correlation, a face mask can be applied in step 132, e.g., to restrict processing to the skin portion of the face, and to remove thereby dark features of the face with poor albedo and/or to remove noise from independent motion of the eyes. FIG. 5(*e*) depicts an example face mask. Local, pixel-by-pixel correlation is then computed in step 134, for example, for each of the image frames shown in FIGS. 5(*f*)-5(*k*). These images correspond to a full cycle of the RGB multi-spectral pattern, and the respective pixel-by-pixel correlations can be averaged and processed to obtain the final 2D correlation image shown in FIG. 5(*c*).

In some implementations, in computing the local, pixel-by-pixel correlation, the recovered phase lag from the global correlation above can be used in the step 134 to avoid the need for an expensive correlation search in the volumetric data corresponding to the stabilized and normalized frames obtained in step 110. In some implementations, average normalized spatial cross correlation values are computed separately, in steps 136, 138, respectively, for the left and the right sides of the face mask. The maximum of the two spatial correlations can be selected in step 140. This can provide a more robust correlation measure than a single average, since extreme lighting conditions are often limited to only one side of the face. Alternately, the global average for all pixels of the face mask can be used if the ambient brightness value from EXIF metadata is low enough to make saturation unlikely, such as can be found in most indoor environments. FIG. 5(*d*) depicts a saturation image corresponding to the 2D correlation image shown in FIG. 5(*c*). The final averaged local correlation measure, denoted nxcorr2, can be a second liveness measure.

Typically, the skin of a real face provides relatively diffuse reflection with high albedo and, as such, the correlation value at each pixel can be high. The correlation image tends to be fairly uniform as well, with relatively low spatial variance. In contrast, when a video monitor is used for impostor playback, the monitor tends to behave like a mirror and, depending on the angle of reflection of light emitted from the display screen on which the RGB multi-spectral pattern is rendered, the light is either primarily reflected back locally in a small portion of the image of the face captured on the screen (as depicted in FIG. 6) or is reflected away from the display screen, as shown in FIG. 7.

Figure 6:
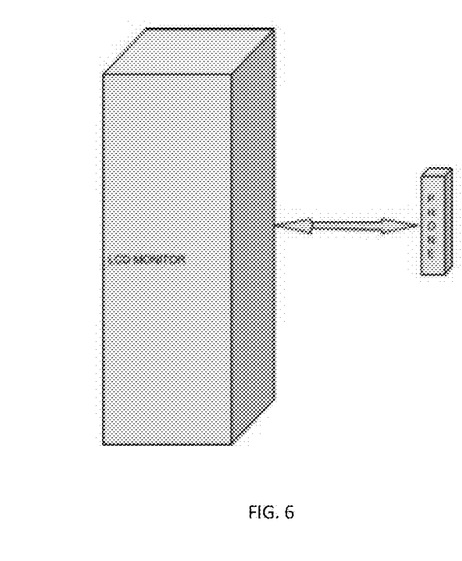
FIG. 6 depicts an example configuration of an LCD monitor rendering a fake image and a phone capturing and analyzing the fake image.
Figure 7:
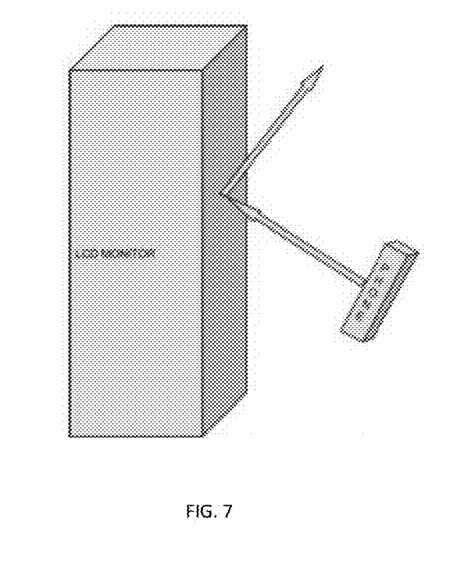
FIG. 7 depicts another example configuration of an LCD monitor rendering a fake image and a phone capturing and analyzing the fake image.
Figure 8:
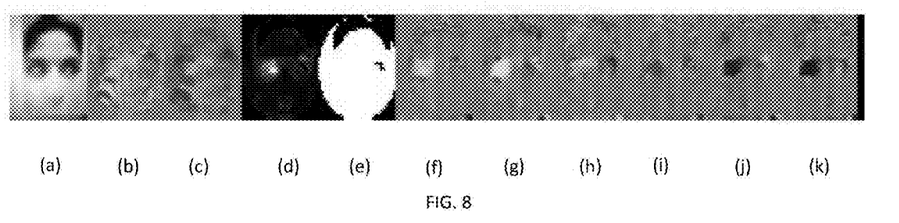
FIGS. 8(a)-8(k) depict a fake mean image frame captured from an LCD monitor configured as shown in FIG. 6, the corresponding 2D correlation image, and video frames, corresponding to a full cycle of the RGB signal, using which the 2D correlation image shown in FIG. 8(b) is computed.

For example, FIG. 8(*a*) depicts a captured imposter image that is displayed on a LCD screen held in front of the device to which access is to be authorized (e.g., a phone), as shown in FIG. 6. FIGS. 8(*b*) and 8(*c*) show the corresponding 2D correlation images, FIG. 8(*d*) shows the corresponding saturation image, FIG. 8(*e*) shows the applied face mask, and FIGS. 8(*f*) through 8(*k*) depict various captured image frames corresponding to a full cycle of the RGB multi-spectral pattern provided as shown in step 102 in FIG. 1. In this example, the second measure nxcorr2 is high (about 0.63) because the LCD screen is held parallel to the phone used to capture the images, and because the LCD screen acts as a mirror. The first measure nxcorr, i.e., the global correlation, is low, however, indicating that the captured images are likely not obtained from a live source. If the LCD screen displaying the imposter images is held at an angle relative to the screen used to render the RGB multi-spectral pattern, as shown in FIG. 7, for example, both nxcorr2 and nxcorr values are expected to be low, i.e., less than a selected threshold such as 0.5, 0.4, 0.3, etc. A typical example corresponding to this case, where light is reflected away from the camera, is shown in FIGS. 9(a)-9(k). In this case neither the global nor the average local correlation measures correspond to the expected RGB signal, generally causing both measures nxcorr and nxcorr2 to be low. As such, the filtered response signal obtained in step 124 can be very noisy, as the 1D RGB signal shown in FIGS. 10(a) through 10(c) illustrate.

Figure 9:
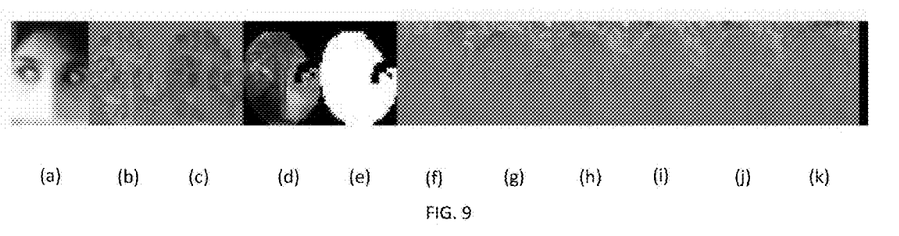
FIGS. 9(a)-9(k) depict a fake mean image frame captured from an LCD monitor configured as shown in FIG. 7, the corresponding 2D correlation image, and video frames, corresponding to a full cycle of the RGB signal, using which the 2D correlation image shown in FIG. 9(b) is computed.
Figure 10:
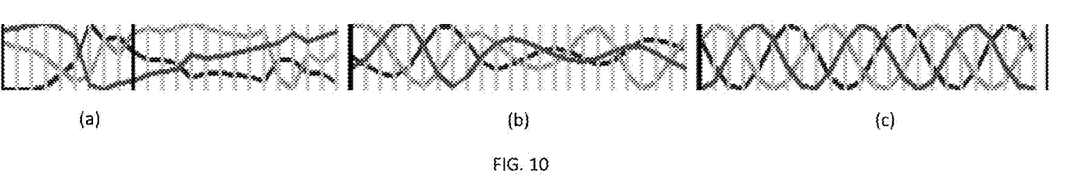
FIGS. 10(a)-10(c) depict the recovered RGB signals corresponding to the sequence of captured fake video frames shown in FIGS. 9(f)-9(k), band-pass filter response of the recovered RGB signals, and the corresponding rendered reference RGB signals, respectively.
Figures 11A, 11B, 11C, 11D:
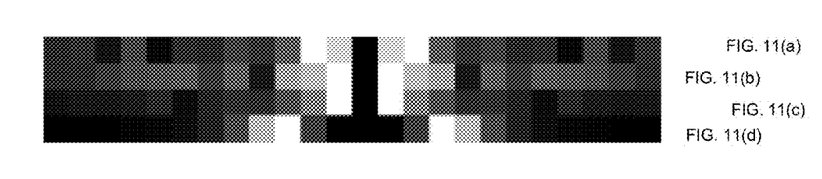
FIG. 11 rows (a)-(c) depict, top to bottom, fast Fourier transform (FFT) periodograms of the RGB signals depicted in FIGS. 10(a)-10(c), respectively.

In addition to exploiting the mirror like properties of many video playback screens, the correlation measures can reflect other anomalies from a video playback, e.g., sampling artifacts such as vertical bands in the temporal band-pass filtered output images, as can be seen in the last six frames in FIG. 9. In one implementation, a normalized FFT for each color signal represented in the filtered response signal is a strong indicator that the subject is an impostor, as can be seen in FIG. 11. The top three rows are the periodograms corresponding to the red, green, and blue color channels, obtained from the filtered response signal (obtained in step 110, FIG. 1). The final row is a temporal-bandpass Butterworth filter tuned to the expected period of the signal in the recorded video. A low ratio of the filtered band-pass signal to the total energy of the signal is another measure that can be used to detect impostor cases.

Figure 12:
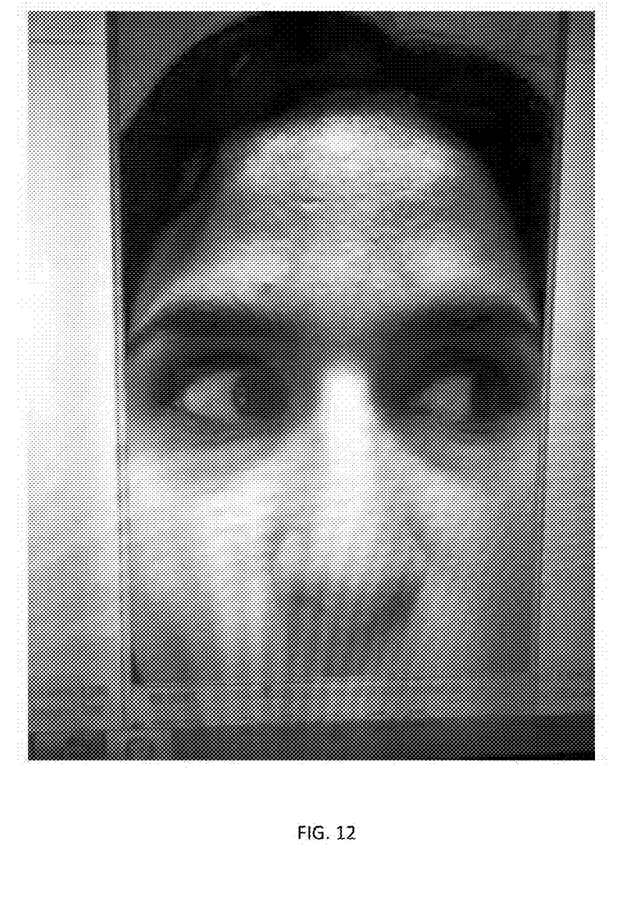
FIG. 12 depicts Moiré patterns associated with a fake image.
Figure 15:
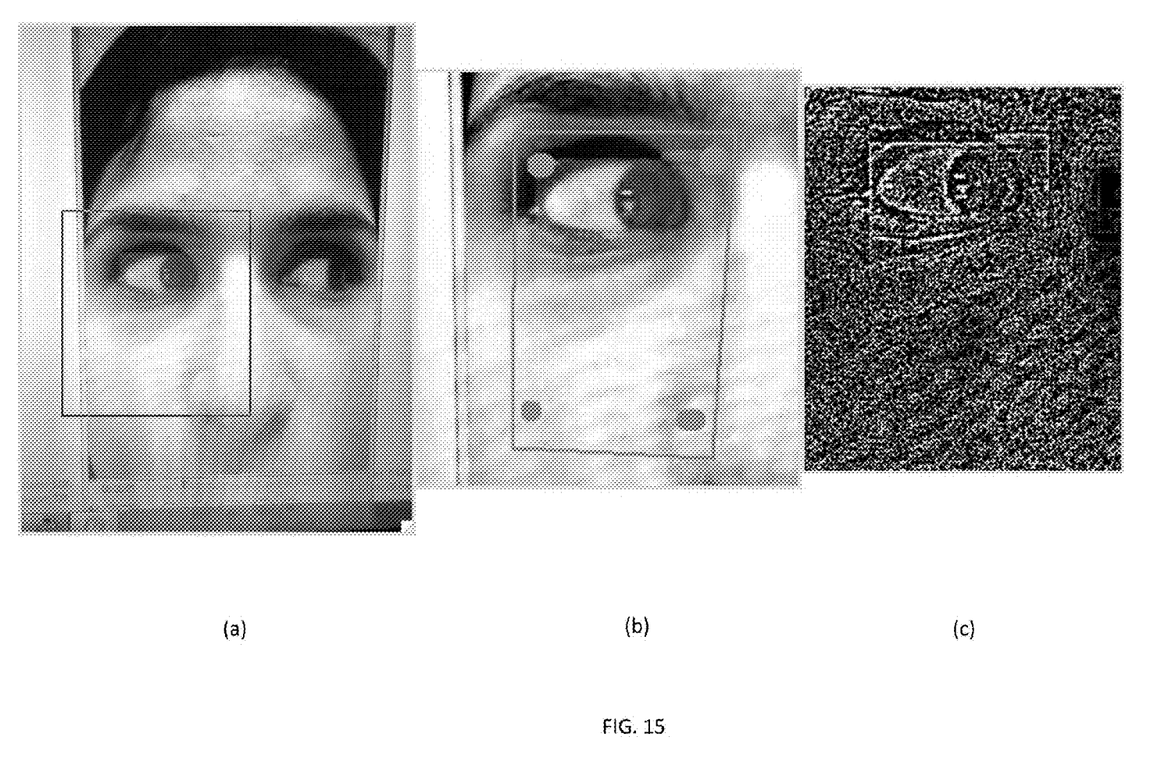
FIG. 15(a) shows the fake image depicted in FIG. 12 at a higher resolution.
FIGS. 15(b) and 15(c) show a high resolution cropped portion of the image depicted in FIG. 15(a) and local, 2D correlation computed according to the procedure shown in FIG. 13.

Analysis of reflections from the LCD screen held in front of the image capturing device (e.g., a cell phone camera) can be used to assist in the detection of an imposter when, e.g., nxcor2 is high but nxcorr is low, as described with reference to FIGS. 8(a)-8(k). For example, FIGS. 15(a)-15(c) show a fake image displayed on an LCD screen held in front of a camera, a cropped image of the region of the face near the eye, and an edge image corresponding to the cropped image, depicting a reflection of the phone that was used to capture the fake image displayed on the LCD screen. Another artifact is moire patterns from the monitor that are visible in the 2D correlation image, as can be seen in FIG. 12. A 2D classifier, such as a Haar classifier, can be trained to identify patterns in the correlation image that are unique to imposter cases. In general, in various implementations, an authentic classification is returned if and only if both the global correlation (nxcorr) and the global correlation (nxcorr2) exceed a predetermined threshold.

Figure 13:
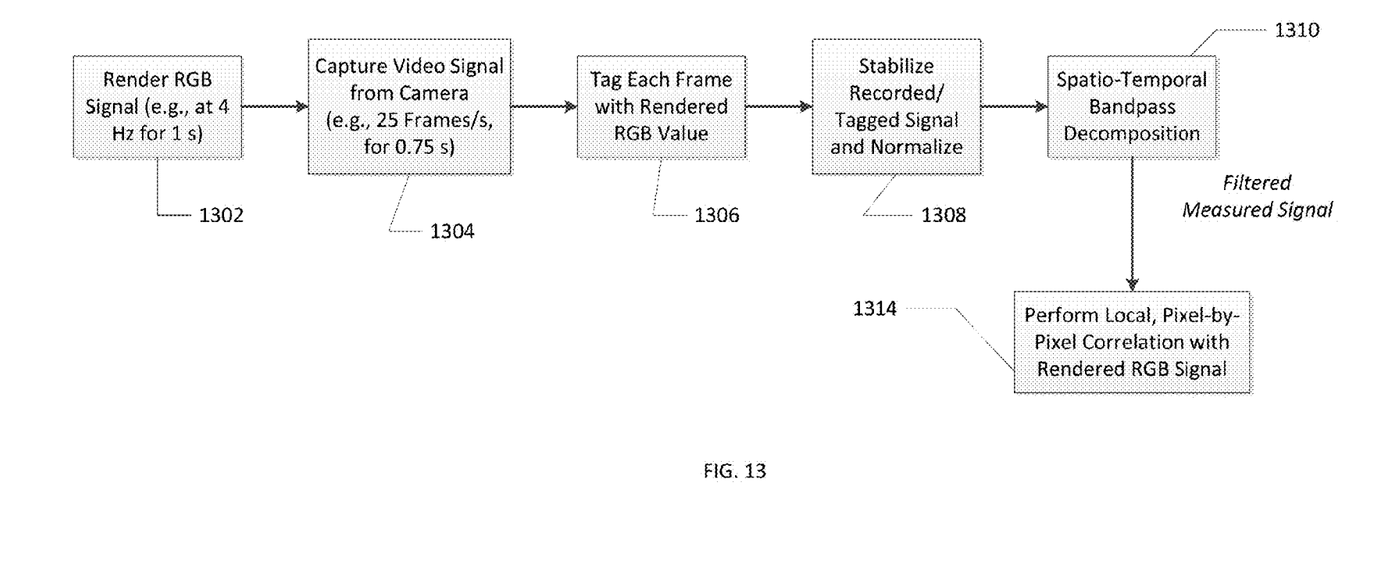
FIG. 13 illustrates another example procedure to detect liveness of an eye.

FIG. 13 illustrates another imposter detection technique that takes advantage of the reflective properties of a typical eye. Specifically, step 1302 of rendering an RGB multi-spectral pattern, step 1304 of capturing a video signal, step 1306 of tagging each frame with a RGB value, and step 1306 of stabilizing the recorded and tagged video signal are performed similarly as described above with reference to FIG. 1. Thereafter, in step 1308 a spatio-temporal bandpass decomposition is performed to exploit convex reflective properties of the eye. It is observed that an eye typically has a convex reflective surface so that each image frame captured in the step 1304 includes a reduced mirror image of the environment of the eye, which can include a compact image of the RGB pattern rendered on a display screen in the step 1302.

In step 1310 temporal band-pass filters are applied to a Laplacian pyramid corresponding to stabilized, tagged signals. The Laplacian pyramid can provide a spatial band-pass decomposition of the input video to help isolate the primarily high spatial frequencies of the RGB multi-spectral pattern reflected from the eye.

A local, pixel-by-pixel 2D correlation image is then produced via temporal normalized cross correlation between the reference signal and the video band-pass filtered output, in step 1312. A local average in a small neighborhood of the dominant peak can be used as an additional liveness measure.

Figure 14:
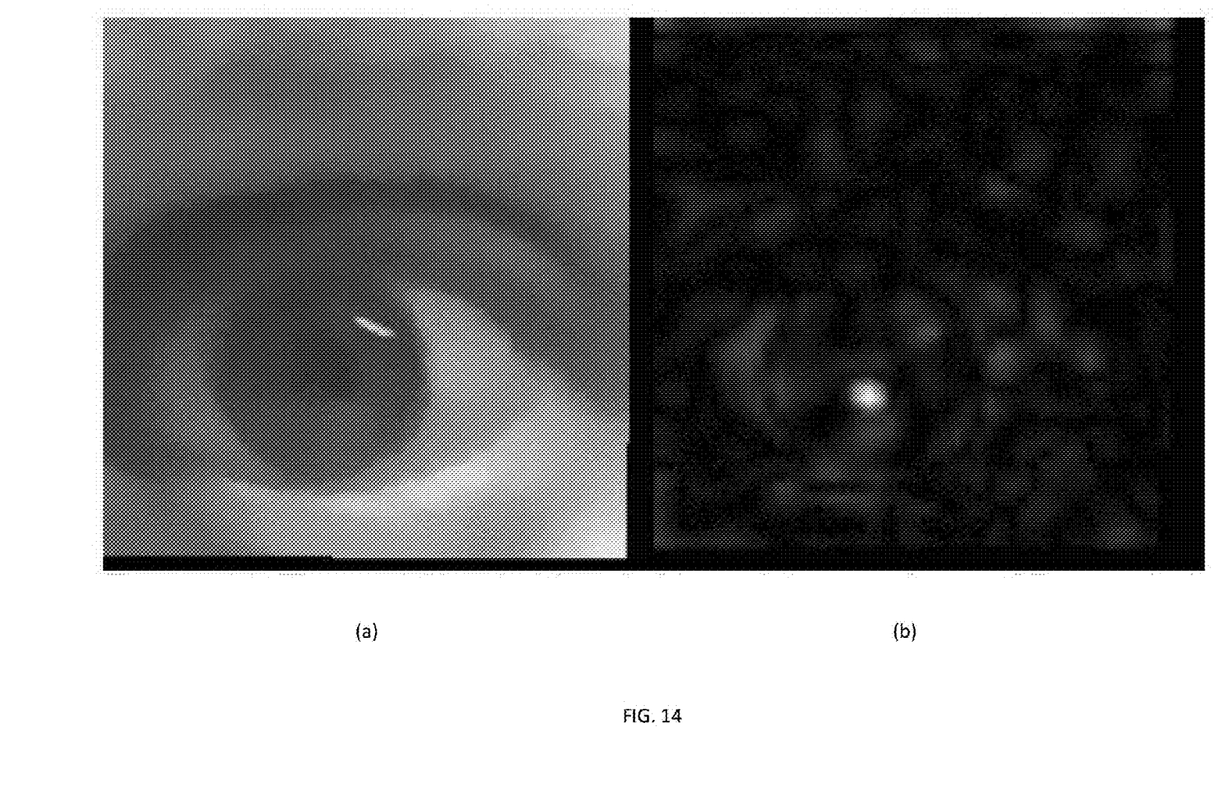
FIGS. 14(a) and 14(b) depict an example eye reflecting a phone capturing an image of the eye, and corresponding 2D correlation image, respectively.

In general, this approach can detect eye-liveness as opposed to detecting face liveness using the first and second measures described above. In a local pixel-by-pixel correlation for just the eye region of an authentic, live eye, only one bright spot corresponding to reflection of the rendered RGB signal by the pupil of the eye is expected, as can be seen in FIGS. 14(a) and 14(b). If multiple spots are seen or no spots are detected, it is determined that the captured images are likely supplied by an imposter.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and can interact through a communication network. The relationship of client and server arises by virtue of computer programs running on the respective computers and having a client-server relationship to each other. A number of embodiments have been described. Nevertheless, it will be understood that various modifications may be made without departing from the spirit and scope of the invention.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and can interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:
1. A computer-implemented method comprising:
rendering on a display device a time-varying multi-color signal comprising a plurality of different color signals that are separated in phase from each other;
during the rendering, capturing a plurality of images of a target that is illuminated by the rendered multi-color signal, the plurality of images representing a plurality of frames;
tagging the frames with respective color values of the multi-color rendered signal at the time respective images corresponding to the frames were captured;
applying a band pass filter temporally to the images to generate a plurality of filtered images;
extracting a filtered response signal from the filtered images;
generating a frame-level temporal correlation measure based on, at least, a frame-level temporal correlation between respective tagged color values and respective dominant color values of the filtered response signal;
calculating across the plurality of frames, for each pixel location, a pixel-level temporal correlation score from temporal correlation between respective color values of pixels at that pixel location in respective frames and respective color values of the multi-color rendered signal at the time respective images corresponding to the frames were captured;
generating a pixel-level temporal correlation measure based on, at least, the plurality of the pixel-level temporal correlation scores; and accepting or rejecting the target based on, at least, the frame-level and pixel-level temporal correlation measures.

2. The method of claim 1 wherein each respective signal of the multi-color signal is a different color.

3. The method of claim 2 wherein each of the colors is rendered using a same frequency.

4. The method of claim 1 wherein each respective signal of the multi-color signal is a different monochromatic signal.

5. The method of claim 1 wherein the multi-color signal is sinusoidal.

6. The method of claim 1 wherein each respective signal of the multi-color signal is a distinct sinusoid and wherein the sinusoids are superimposed in the multi-color signal.

7. The method of claim 1 wherein the respective signals of the multi-color signal are randomly generated.

8. The method of claim 1 wherein a particular respective value of a pixel location is a color.

9. The method of claim 1 wherein each image comprises a plurality of respective images that are each: respectively transformed, at a different respective resolution, or comprise a different respective spatial frequency band that corresponds to a selected illumination phenomenon.

10. The method of claim 1 wherein the frame-level temporal correlation measure is further based on whether a phase of the multi-color signal matches a phase of the filtered response signal.

11. The method of claim 1 wherein extracting the filtered response signal from the filtered images comprises extracting the filtered response signal from the respective dominant color value of each of the filtered images.

12. The method of claim 1, further comprising stabilizing the target in the plurality of images before applying the band pass filter.

13. The method of claim 1 wherein the band pass filter is applied in the frequency domain or in the time domain.

14. The method of claim 1 wherein generating the pixel-level temporal correlation measure based on, at least, a plurality of the pixel location correlation scores comprises combining the pixel location correlation scores to generate the pixel-level temporal correlation measure.

15. The method of claim 14 wherein the target is a human face and wherein the combined pixel location correlation scores are for pixel locations of a particular region of the face.

16. The method of claim 15 wherein the particular region of the face is determined using at least one of: (i) dynamic image analysis to avoid, at least in part, one or more portions of the face that are occluded or over exposed in the plurality of images, and (ii) a mask or a weight map representing knowledge about features of the face that are likely to reflect the rendered multi-color signal.

17. The method of claim 1 wherein each pixel location represents a respective plurality of image data elements.

18. The method of claim 17 wherein a plurality of the image data elements are at different resolutions.

19. The method of claim 18 wherein each pixel location is a weighted combination of the pixel location's respective image data elements.

20. The method of claim 1 wherein the captured plurality of images represents a Gaussian pyramid or a Laplacian pyramid.

21. The method of claim 20 wherein a particular filtered image of the filtered images represents a weighted combination of a plurality of pyramid levels.

22. A system comprising a processor and memory in electronic communication with the processor, the processor being programmed to perform operations comprising:
    rendering on a display device a time-varying multi-color signal comprising a plurality of different color signals that are separated in phase from each other;
    during the rendering, capturing a plurality of images of a target that is illuminated by the rendered multi-color signal, the plurality of images representing a plurality of frames;
    tagging the frames with respective color values of the multi-color rendered signal at the time respective images corresponding to the frames were captured;
    applying a band pass filter temporally to the images to generate a plurality of filtered images;
    extracting a filtered response signal from the filtered images;
    generating a frame-level temporal correlation measure based on, at least, a frame-level temporal correlation between respective tagged color values and respective dominant color values of the filtered response signal;
    calculating across the plurality of frames, for each pixel location, pixel-level temporal correlation score from temporal correlation between respective color values of pixels at that pixel location in respective frames and respective color values of the multi-colored rendered signal at the time respective images corresponding to the frames were captured;
    generating a pixel-level temporal correlation measure based on, at least, the plurality of the pixel-level temporal correlation scores; and
    accepting or rejecting the target based on, at least, the frame-level and pixel-level temporal correlation measures.

23. The system of claim 22 wherein the processor is programmed to provide each respective signal of the multi-color signal in a different color.

24. The system of claim 23 wherein the processor is programmed to render each of the colors using a same frequency.

25. The system of claim 22 wherein each respective signal of the multi-color signal is a distinct sinusoid and wherein the sinusoids are superimposed in the multi-color signal.

26. The system of claim 22 wherein a particular respective value of a pixel location is a color.

27. The system of claim 22 wherein each image comprises a plurality of respective images that are each: respectively transformed, at a different respective resolution, or comprise a different respective spatial frequency band that corresponds to a selected illumination phenomenon.

28. The system of claim 22 wherein the processor is further programmed to extract the filtered response signal from the filtered images by extracting the filtered response signal from the respective dominant color value of each of the filtered images.

29. The system of claim 22, wherein the processor is further programmed to stabilize the target in the plurality of images before applying the band pass filter.

30. The system of claim 22 wherein for generating the pixel-level temporal correlation measure based on, at least, a plurality of the pixel location correlation scores, the processor is further programmed to combine the pixel location correlation scores to generate the pixel-level temporal correlation measure.

* * * * *